US009588907B2

(12) United States Patent
Baldischweiler et al.

(10) Patent No.: US 9,588,907 B2
(45) Date of Patent: Mar. 7, 2017

(54) INITIAL OPERATION OF A PORTABLE DATA CARRIER

(75) Inventors: Michael Baldischweiler, Munich (DE); Wolfgang Rankl, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 477 days.

(21) Appl. No.: 13/978,432

(22) PCT Filed: Feb. 15, 2012

(86) PCT No.: PCT/EP2012/000666
§ 371 (c)(1),
(2), (4) Date: Jul. 5, 2013

(87) PCT Pub. No.: WO2012/113522
PCT Pub. Date: Aug. 30, 2012

(65) Prior Publication Data
US 2013/0282968 A1    Oct. 24, 2013

(30) Foreign Application Priority Data
Feb. 21, 2011  (DE) .................. 10 2011 011 910

(51) Int. Cl.
*G06F 12/14*    (2006.01)
*G08B 29/00*    (2006.01)
(Continued)

(52) U.S. Cl.
CPC .............. *G06F 12/14* (2013.01); *G06F 21/31* (2013.01); *G06F 21/79* (2013.01);
(Continued)

(58) Field of Classification Search
CPC .......... G06F 12/14; G06F 21/31; G06F 21/79; G06F 2221/2107; G06F 2213/0038; G06K 19/07769; G06K 19/07726
(Continued)

(56) References Cited

U.S. PATENT DOCUMENTS 5,204,663 A  *  4/1993  Lee .............................. 340/5.28
6,371,378 B1     4/2002  Brunet et al.
(Continued)

FOREIGN PATENT DOCUMENTS

| CN | 1144496 C | 3/2004 |
| CN | 101080732 A | 11/2007 |

(Continued)

OTHER PUBLICATIONS

International Search Report in PCT/EP2012/000666, May 14, 2012.
Search Report in German Patent Application DE 10 2011 011 910.8, Sep. 10, 2012.

*Primary Examiner* — Aravind Moorthy
(74) *Attorney, Agent, or Firm* — Workman Nydegger

(57) ABSTRACT

In a portable data carrier having a non-volatile memory, a memory controller and a memory interface, an effected initial operation of the data carrier is checked through a request to a security unit of the data carrier via a security interface connected to the security unit. For this purpose, the data carrier comprises a memory portion comprising the memory interface and a body portion comprising the security interface, which are interconnected such that the memory portion can be folded out of the body portion, so that simultaneously the memory interface is laid open for a connection to an end device and the electrical connection between the security unit and the security interface is disconnected irreversibly.

17 Claims, 3 Drawing Sheets

S1  STORE data in nvm
S2  ENCRYPT nvm
S3  PERSONALIZE card
S4  SHIP card to user
S5  VERIFY initial_operation_status
S5a   REQUEST ios_message
S5b   RETURN ios_message
S6  AUTHENTICATE
S7  DECRYPT nvm
S8  UNLOCK nvm
S9  INITIALLY_OPERATE card
S9a   LAY_OPEN interface  }
S9b   DISCONNECT se      }
S10 VERIFY initial_operation_status
S10a  REQUEST ios_message ⇒ no ios_message
S10b  DISPLAY used_message
S11 CONNECT card
S12 READ data

(51) Int. Cl.
*G06K 19/077* (2006.01)
*G06F 21/31* (2013.01)
*G06F 21/79* (2013.01)

(52) U.S. Cl.
CPC . *G06K 19/07726* (2013.01); *G06K 19/07769* (2013.01); *G06F 2213/0038* (2013.01); *G06F 2221/2107* (2013.01)

(58) Field of Classification Search
USPC .................. 726/4, 34; 713/187, 193, 194
See application file for complete search history.

(56) References Cited

U.S. PATENT DOCUMENTS

| | | | |
|---|---|---|---|
| 6,386,459 B1 | 5/2002 | Patrice et al. | |
| 6,975,883 B1 | 12/2005 | Richter | |
| 7,027,859 B1* | 4/2006 | McNichols et al. | 604/20 |
| 8,544,733 B2 | 10/2013 | Finkenzeller et al. | |
| 2002/0117541 A1* | 8/2002 | Biggar | G06Q 30/04 235/379 |
| 2004/0033727 A1 | 2/2004 | Kao | |
| 2004/0052147 A1* | 3/2004 | McLaury | G11C 8/16 365/230.05 |
| 2006/0069914 A1* | 3/2006 | Rupp et al. | 713/168 |
| 2006/0071863 A1* | 4/2006 | Lindell | 343/702 |
| 2006/0108979 A1* | 5/2006 | Daniel et al. | 320/112 |
| 2006/0184799 A1* | 8/2006 | Seo et al. | 713/182 |
| 2006/0224889 A1* | 10/2006 | Adkins | H04L 9/3271 713/168 |
| 2007/0226518 A1* | 9/2007 | Yasaki | G06F 21/575 713/189 |
| 2008/0244135 A1* | 10/2008 | Akesson et al. | 710/241 |
| 2008/0252450 A1* | 10/2008 | Wandel | 340/541 |
| 2008/0288403 A1* | 11/2008 | von Mueller | 705/44 |
| 2008/0320317 A1* | 12/2008 | Funahashi et al. | 713/189 |
| 2009/0193517 A1* | 7/2009 | Machiyama | 726/18 |
| 2010/0064127 A1* | 3/2010 | Lee | 713/2 |
| 2010/0224682 A1* | 9/2010 | Busch-Sorensen | 235/380 |
| 2011/0107095 A1* | 5/2011 | Malzahn | G06F 21/10 713/168 |
| 2011/0173458 A1* | 7/2011 | Bonica | 713/193 |
| 2012/0036372 A1* | 2/2012 | Leclercq | H04N 21/418 713/192 |

FOREIGN PATENT DOCUMENTS

| | | |
|---|---|---|
| CN | 101479744 A | 7/2009 |
| DE | 10 2008 000 011 A1 | 7/2009 |
| EP | 0 520 455 A2 | 12/1992 |
| EP | 1 068 590 B1 | 1/2001 |
| EP | 1 183 895 B1 | 3/2002 |
| EP | 1 835 448 A1 | 9/2007 |
| WO | 2009/087018 A1 | 7/2009 |
| WO | 2010/112446 A1 | 10/2010 |

\* cited by examiner

FIG 1

| | |
|---|---|
| S1 | STORE data in nvm |
| S2 | ENCRYPT nvm |
| S3 | PERSONALIZE card |
| S4 | SHIP card to user |
| S5 | VERIFY initial_operation_status |
| S5a | REQUEST ios_message |
| S5b | RETURN ios_message |
| S6 | AUTHENTICATE |
| S7 | DECRYPT nvm |
| S8 | UNLOCK nvm |
| S9 | INITIALLY_OPERATE card |
| S9a | LAY_OPEN interface |
| S9b | DISCONNECT se |
| S10 | VERIFY initial_operation_status |
| S10a | REQUEST ios_message ⇒ no ios_message |
| S10b | DISPLAY used_message |
| S11 | CONNECT card |
| S12 | READ data |

INITIAL OPERATION OF A PORTABLE DATA CARRIER

BACKGROUND OF THE INVENTION

The present invention relates to a method for initially operating a portable data carrier, to a portable data carrier, and to a method for manufacturing such a data carrier.

For secure data transmission, use is frequently made of portable data carriers having non-volatile memories, e.g. USB tokens, flash memory elements or the like, which can be connected to an end device via a preferably standardized interface, in order that said device can read out useful data from the memory. This kind of data transmission is also employed by institutions and companies, e.g. by manufacturers or issuers of products involving telecommunications technology and/or information technology, such as e.g. electronic, possibly portable end devices or software, in order to make important useful data, such as e.g. updating data for products, firmware updates or software updates, access data or the like, available to users or customers directly or indirectly via a mandated data-carrier issuer.

In so doing, it is essential that a user can be sure of the intactness and integrity of the thus obtained useful data, e.g. by being able to ascertain without any doubt, if possible, that the data carrier has not been tampered with on its way, e.g. by mail, from the data-carrier issuer to the user, e.g. by being equipped with malicious code or tampered-with useful data. In this connection there exists the problem that a user can at first not verify for sure on the basis of the obtained data carrier whether it is still present in the unused and untampered-with delivery state or preoperational state intended by the data-carrier issuer. The user can thus not distinguish between an insecure data carrier that has already been initially operated and a secure data carrier not yet initially operated.

The "initial operation" of the data carrier is to be understood here as its first-time proper employment after manufacture and after the desired configuration in terms of data, with the term "initial operation" also including necessary and preparatory measures that enable its immediate first-time employment, such as e.g. the removal of an optical security seal or the like.

Besides the per se known employment of an optical security seal for proving a preoperational state of the data carrier, EP 1 183 895 B1 proposes that the initial operation of a data carrier requires a confirmation of initial operation by the user which is stored in the data carrier and can be checked via a contact-type interface of the data carrier. In contrast, EP 1 068 590 B1 proposes irreversibly activating an antenna interface of the data carrier by disconnecting a connection bridge upon initial operation.

It is therefore the object of the present invention to propose a portable data carrier wherein a user can check in a simple and secure manner whether an initial operation has already taken place.

SUMMARY OF THE INVENTION

A conventional portable data carrier normally comprises a non-volatile memory, a memory controller and a memory interface via which an end device can access useful data in the memory of the data carrier. According to the invention, a user of such a data carrier can check whether the data carrier is still present in the preoperational state and the useful data are thus untampered-with and trustworthy, or whether an initial operation of the data carrier has already been effected and said data carrier is to be classified as insecure. The fact that the data carrier is still, or no longer, in the preoperational state is manifested irreversibly, if possible, internally in the data carrier.

For this purpose, the user directs a request to a security unit of the data carrier, which unit is connected to the security interface and different from the memory controller, via a security interface different from the memory interface. The security unit and the security interface are arranged in the data carrier, and configured so as to be mutually coordinated in terms of the method, such that an effected initial operation is manifested irreversibly, if possible, internally in the data carrier and can be reliably ascertained by means of the request to the security unit. From a reaction of the security unit to the request, the user can derive without any doubt whether or not the data carrier is still present in the preoperational state.

The advantage of this initial-operation seal realized by software means is that a check for a preoperational state of the data carrier can already be carried out before the data carrier is connected to an end device via the memory interface. In this way it is possible to avoid damage to the end device via the memory interface through tampered-with useful data, because the data carrier does not have to be connected to an end device via the memory interface for the preoperational state to be checked.

Via the security interface only the security unit can preferably be addressed, but not the non-volatile memory or the memory controller. For this reason there is no risk whatsoever of the useful data being damaged or of malicious code being incorporated into the memory via the security interface. The configuration of the data carrier with a first (memory) interface/controller arrangement exclusively for accessing the useful data in the memory, and a second (security) interface/controller arrangement adequately separate from the first arrangement physically and/or in terms of data enables a largely risk-free and autonomous check of an effected initial operation of the data carrier. Preferably, the memory interface is a contact-type interface and the security interface a contactless, e.g. antenna, interface.

Depending on whether the request to the security unit is effected before or after an initial operation of the data carrier, it leads to different results. The reason for this is that an initial operation is preferably registered or manifested in the data carrier such that a message indicating the preoperational state and queriable before the initial operation is no longer queriable after the initial operation. Preferably, the specified message is output by the security unit as a reaction to the request only before the initial operation, while the specified message is no longer output, or can no longer be output, after the initial operation of the data carrier.

Preferably, the security unit no longer outputs any message at all in reaction to a request after the initial operation. This has the advantage that the user need not distinguish between different messages, but can assume that the data carrier is unused and secure only when he obtains a message (of any kind) via the security interface. This can be achieved for example by disconnecting an electrical connection between the security unit and the security interface upon the initial operation of the data carrier, e.g. upon a necessary preparatory action by the user, so that a request via the security interface is not even relayed to the security unit after initial operation. After initial operation, no data communication is then possible any more via the security interface.

This mechanically realized initial-operation seal, which is based on a mechanical or physical disconnecting of an electrical connection between the security interface and the security unit upon initial operation, has the advantage that it is irreversible and the electrical connection cannot be restored.

When the electrical connection of the security interface to the security unit has been disconnected for an initially operated data carrier, it cannot be restored. Upon receipt of the specified message on request via the security interface, the user can be sure that the data carrier is actually present in the preoperational state in which it was issued by the data-carrier manufacturer or data-carrier issuer.

The suitable combination of a software-type initial-operation seal, through the security unit answering with a specified message on request via the security interface before the initial operation, and a mechanical initial-operation seal, through irreversible disconnection of an electrical connection in the data carrier after the initial operation, prevents in particular a data carrier or its useful data from being tampered with on its way from the data-carrier manufacturer or data-carrier issuer to the user without this being recognizable to the user. The corresponding risk of the user is thereby reduced to a minimum.

Preferably, the data-carrier body of the data carrier is formed from a memory portion and a body portion, with the memory portion comprising at least the memory interface and the body portion at least the security interface. In the preoperational state of the data carrier, the memory portion and the body portion are then preferably interconnected, and arranged relative to each other, such that the memory interface is not usable, i.e. a connection to an end device via the memory interface is impossible by design. The initial operation of the data carrier then preferably consists in laying open the memory interface such that a connecting to an end device is in any case mechanically possible.

In the preoperational state the memory portion is preferably mounted in the body portion so as to be swivelable, foldable or otherwise suitably relatively movable such that it can be laid open for a connection to an end device by being swiveled or folded out of the body portion.

The electrical connection between the security interface and the security unit preferably extends within the data carrier here such that the swiveling or folding of the memory portion out of the body portion for the purpose of initial operation causes the irreversible disconnection of the electrical connection substantially simultaneously. For example, the electrical connection can be laid across a transition region between the memory portion and the body portion, so that it breaks as soon as the memory portion is swiveled or folded out of the body portion.

Through the particularly preferred design of the data-carrier body such that an initial operation of the data carrier requires a previous laying open of the memory interface, which inevitably and necessarily results in the disconnection of the electrical connection between the security interface and the security unit, it is ensured that an access to the memory of the data carrier by an end device immediately leads to disconnection of the electrical connection and to termination of the preoperational state. Every access of an end device to the memory is thus directly recognizable through a request via the security interface remaining unanswered due to the disconnection of the electrical connection.

Upon the manufacture of the portable data carrier according to the invention, the memory portion and the body portion are manufactured, and arranged movably relative to each other, such that the memory portion must be moved relative to the body portion, upon laying open of the memory interface, such that the electrical connection between the security unit and the security interface is disconnected or breaks.

An electrical reconnecting of the security unit and the security interface is then no longer possible. For this purpose, the electrical connection is arranged so as to extend across the transition region from the body portion to the memory portion (or vice versa) such that a disconnection or break in the region of the transition region cannot be restored by mere swiveling back or folding back. For example, the contact areas arising upon disconnecting or breaking can be irreversibly damaged, deformed or otherwise rendered useless, so that a recontacting is impossible.

Although almost any structural forms of such a portable data carrier are conceivable that fulfill the above-mentioned criteria for the initial operation of a portable data carrier, a data carrier according to the invention is preferably manufactured for practical reasons as a card-shaped data carrier, e.g. in the form of a memory card in the ID1 chip-card format equipped with a contact-type USB memory interface. The memory portion is preferably manufactured here as a USB memory token in chip-card thickness and inserted into a corresponding recess of the chip-card-shaped body portion so as to be swivelable out or foldable out. In the body portion the security interface is then realized as an antenna interface.

In the transition region from the memory portion to the body portion the electrical connection between the security interface and the security unit can be realized e.g. with those conductive pastes, conductive adhesives or the like that no longer form electrical conductivity upon recontacting. Also, the electrical connection in the transition region can be configured as an irreversible break, e.g. by the ends of the electrical connection that have broken in the transition region being shifted locally by suitable mechanical forces or superimposed by non-conductive material.

Upon the data-carrier manufacture the security interface can also be laminated as an antenna layer in or on the plastic layers forming the card-shaped data-carrier body, so that when the memory portion is folded out a part of the antenna layer breaks irreversibly.

The security unit which outputs the specified message on request via the security interface in the preoperational state can be arranged in the memory portion as well as in the body portion of the data carrier and preferably represents an electronic security element or security module specially secured by data technology, e.g. cryptographically, and/or mechanically against data tampering, or a security chip or controller which is preferably addressable exclusively via the security interface. A disconnection of the electrical connection to the security interface cannot be avoided here through a request via the memory interface.

If the security unit is arranged in the memory portion, the electrical connection preferably leads across the transition region between memory portion and body portion to the security interface. If the security unit is arranged in the body portion, the electrical connection preferably nevertheless leads across the transition region from the body portion into the memory portion and back into the body portion again such that in this case, too, the electrical connection is irreversibly disconnected by laying open the memory interface in the transition region upon initial operation of the data carrier.

The data-carrier memory comprising the useful data can in principle be any suitable non-volatile memory, for example a flash memory or the like. Preferably, it comprises important updating data, e.g. firmware updates or software updates, for an electronic or software product. After initial operation of the data carrier and connecting of the data carrier to an end device via the USB memory interface, the end device accesses the flash memory, reads out the updating data and installs them as intended.

The security interface separate from the USB memory interface is preferably a contactlessly addressable interface, for example an antenna interface which is suitably laid in the body portion of the data carrier to pick up a contactless request and relay it to the security unit before the initial operation of the data carrier.

The memory controller of the data carrier controls accesses of an end device via the memory interface to the memory. As a further security measure in addition to the above-described irreversibly ascertainable initial operation, the memory controller can release memory accesses after initial operation of the data carrier preferably only when an access entitlement or authorization was previously checked and its presence ascertained by the security interface.

When such an access entitlement is present, the security unit can e.g. create an entitlement flag, i.e. an accordingly assigned variable, to signal an existing access entitlement to the memory controller. If the entitlement flag is not deposited in the security unit or at a specified memory location in the non-volatile memory, no access to the memory is granted by the memory controller whatsoever. Before ascertainment of the access entitlement the security controller is preferably completely inactive, being activated only by the security unit setting the entitlement flag. Preferably, the flag is set irreversibly, in order that an access to the memory, once it has been granted, is not concealed by subsequent removal of the flag.

The actual check of the access entitlement by the security unit preferably takes place before initial operation of the data carrier, because no data communication connection can be set up with the security unit any more after initial operation. The access entitlement or authorization can be checked in particular by a one-sided or mutual authentication. For example, a user of the data carrier can authenticate himself to the data carrier or to a background system connected to the data carrier, e.g. by stating a secret password, such as e.g. a personal identification number (PIN). Within the framework of the authentication the data carrier can also supply a one-time password to the user with which he can log in, as entitled, to a background system or also an end device.

A further way of securing memory accesses of an end device to the non-volatile memory of the data carrier can be for the memory content of the non-volatile memory to be present in encrypted form and only be decrypted when the security unit has ascertained an access entitlement. This makes it possible to prevent the check of the access entitlement from being avoided and the memory being accessed in spite of a flag not being set. The decryption is preferably carried out by the security unit, preferably with a decryption key that is present in the security unit. Alternatively, the decryption can also be performed by the memory controller with access to the decryption key in the security unit.

Preferably, the decryption is carried out irreversibly, i.e. the useful data, once they are decrypted, cannot be re-encrypted such that they can be decrypted with the relevant decryption key again. If an asymmetric encryption is employed, the encryption key is secret and cannot be employed by unauthorized parties for encrypting tampered-with useful data. Corresponding precautions can also be taken in the security unit. This has the further security advantage that any tampering with the useful data cannot be concealed by re-encrypting.

Preferably, there is integrated in the data carrier, e.g. in its card portion, a display device, e.g. an LCD display or the like. An effected initial operation of the data carrier can be displayed on the display device either on request or, preferably, permanently. The control of the display device by a display controller is preferably configured here such that a display text rendering an effected initial operation—for example by the indication "initially operated", "used" or the like—is displayed on the display device as soon as the electrical connection between the security unit and the security interface is disconnected as a result of the initial operation. The display controller is connected to said electrical connection or, preferably, to a special sensor line which breaks substantially simultaneously with the electrical connection upon the initial operation. The sensor line preferably leads from the display controller at least once across the transition region between the memory portion and the body portion and back to the display controller. The sensor line is then disconnected recognizably for the display controller as soon as the memory portion is swiveled out of the body portion upon the initial operation.

As explained above, the user no longer receives an answer to a request to the security unit after initial operation of the data carrier, because its electrical connection to the security interface has been disconnected. In addition to this, the user receives via the display device a positive indication of the effected initial operation, which is easily recognizable optically, and does not have to rely only on the negative indication that his request to the security unit has remained unanswered.

On the display device there can also be output at the user's prompting, for example via an activation button provided on the data carrier, a one-time password generated by the security unit, with which a user can authenticate himself to a background system or an end device.

Furthermore, there can also be integrated into the portable data carrier as a further security measure a time buffer device which, after initial operation has been effected, enables an access of an end device to the memory via the memory interface only for a specified time duration. As a time buffer device there can be used for example a capacitor which can be charged via the security interface, configured as an antenna, for a certain specified time duration within which the connection to the end device via the memory interface must then come about.

If the user, after the initial operation of the data carrier, does not connect it to an end device via the memory interface within the time duration specified by the time buffer device, every access to the memory is preferably blocked by the memory controller and the data carrier becomes useless. Upon expiry of the time buffer the security unit can for example delete the entitlement flag again and thereby put the memory controller in the inactive state again. Such a removal of a previously set entitlement flag is then irreversible, however.

Preferably, the access to the memory of the data carrier via the memory controller is possible independently of the security controller, after the initial operation at the latest.

BRIEF DESCRIPTION OF THE DRAWINGS

Further features and advantages of the invention will result from the following description of embodiments according to the invention as well as further alternative embodiments in connection with the attached drawings, which show:

FIG. 1 a schematic sequence of the method according to the invention;

DETAILED DESCRIPTION OF PREFERRED EMBODIMENTS

Figure 2:
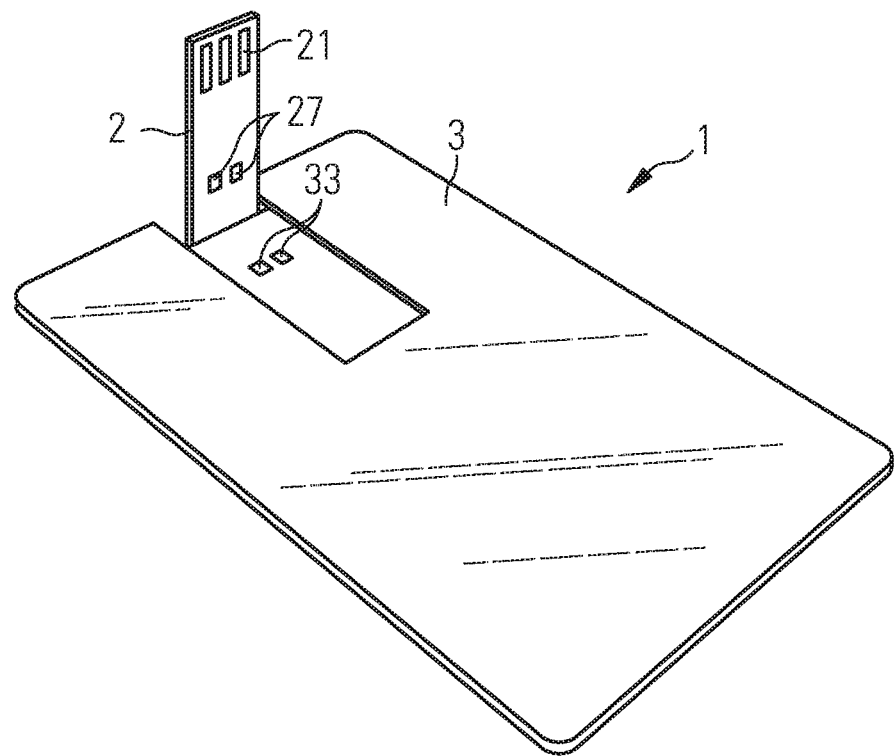
FIG. 2 a preferred embodiment of the data carrier in the form of a USB chip card.

FIG. 1 shows the steps of a method for initial operation of a portable data carrier by a user, such as e.g. the USB chip card 1 with a USB memory interface 21 illustrated in FIG. 2. The USB chip card 1 is designed for the user to put it into operation for the first time after receiving it, connect the USB card 1 to a USB interface of an end device, and load to the end device the useful data intended for the user and stored on the USB card 1.

The present invention is not limited to USB interfaces, however, although the latter are particularly suited due to their wide use and simple handling. Thus, the present invention is applicable in principle to any portable data carriers having any memory interfaces, e.g. also to secure memory cards, MultiMediaCards, SIM mobile radio cards, SD cards or the like. The present invention is likewise not limited to card-shaped data carriers, e.g. to the USB chip cards in the ID1 card format shown in the figures, but rather can be used with portable data carriers of any other structural forms, e.g. also conventional USB tokens or USB memory elements of almost any design.

The USB card 1 equipped with a USB interface 21 can serve for example to relay important or security-relevant useful data from a product manufacturer or another institution to a user in a secure way, e.g. when relaying over a data communication network is inadvisable for security reasons. Such important useful data can be for example updating data which must be loaded to an end device of the user, e.g. firmware updates or software updates, or any further data for configuration, authentication, entitlement, monetary or other security-relevant purposes that the user requires in connection with security-critical computations, operations, devices or processes. To adjust or restrict the employment of the useful data deposited on the USB card 1 to one or several certain users or one or several end devices, the useful data can be accordingly personalized or individualized.

The USB chip card 1 illustrated in FIG. 2 comprises a memory portion 2 configured as a USB token and a body portion 3 configured as a chip-card body which are movably interconnected. Upon the delivery of the USB card 1 to the user it is unused and present in a delivery state or preoperational state. One way that the user can recognize the preoperational state is that the USB token 2 shown in a folded-out state in FIG. 2 lies in a recess provided therefor in the body portion 3 and is fastened therein so that it can be broken out, so that the USB token 2 and the card body 3 form a chip card in the ID1 format. In the delivery state or preoperational state the USB interface 21 cannot be used, because it is hidden in the recess and can not readily be laid open by swiveling out, because there is still a material connection between the USB token 2 and the card body 3 that must be disconnected or destroyed upon the initial operation. The initial operation of the USB card 1 then consists in the USB token 2 being folded or swiveled out of the card body 3 such that the USB card 1 can be connected to an end device via the USB interface 21. In so doing, the material connection is disconnected irreversibly.

Figure 3:
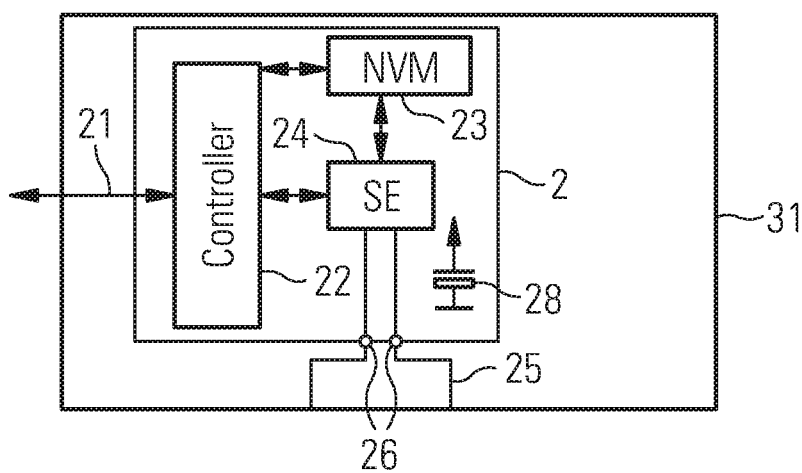
FIG. 3 a schematic overview of a data carrier according to the invention.

FIG. 3 shows the individual electrical and electronic components of the USB card 1. Accordingly, the USB token 2 comprises a non-volatile memory 23 (NVM), e.g. a flash memory or the like, a USB memory controller 22 which controls the access of an end device via the USB interface 21 to the memory 23 with the useful data, as well as a security unit 24 (SE) which is connected to the USB controller 22, on the one hand, and via an electrical antenna connection 25 to an antenna 31 extending within the card body 3, on the other hand. The antenna connection 25 extends here from the security unit 24 across a transition region 26 between the USB token 2 and the card body 3 to the antenna 31. The antenna 31, which represents a contactless interface for data communication with the security unit 24, is laid within the card body 3 in a suitable manner here, for example as a spool antenna along an edge contour of the card body 3.

The transition region, indicated by the reference sign 26, from the memory portion or USB token 2 into the card body 3 represents a disconnecting region at which the antenna connection 25 is disconnected or broken upon initial operation of the USB card 1 such that the security unit 24 can subsequently no longer be addressed by an external device via the antenna 31. Besides the antenna connection 25, the transition region 26 can, for stability reasons, comprise further material connections which additionally connect the USB token 2 to the card body 3 in the preoperational state and are broken open irreversibly upon the initial operation of the USB card 1.

In FIG. 2 the transition region 26 is illustrated for example by the token-side antenna contacts 27 and the card body-side antenna contacts 33, which are firmly interconnected in the delivery state or preoperational state of the USB card 1, being in contact such that a contactless data communication with the security unit 24 via the antenna 31 is possible.

According to the method sketched in FIG. 1, the USB chip card 1 is equipped with the relevant useful data in step S1 by the chip-card manufacturer or chip-card issuer before delivery to the user. Said data are stored in the non-volatile memory 2 of the USB token 2 ("STORE data in nvm"). For securing the useful data, either only said data or the complete memory 2 is encrypted in step S2 by a suitable cryptographic method in the secure environment of the chip-card manufacturer or chip-card issuer ("ENCRYPT nvm"). In so doing, there can be employed an asymmetric or symmetric encryption method wherein the secret encryption key is available to the chip-card issuer or chip-card manufacturer and the associated or identical decryption key is deposited on the USB chip card 1 in the security unit 24 of the USB card 1. In an asymmetric method the secret encryption key is available exclusively to the chip-card issuer or chip-card manufacturer, so that once useful data have been decrypted they cannot be re-encrypted without the help of the chip-card issuer or chip-card manufacturer.

If the useful data deposited in the memory 23 are individual data which are intended only for a certain user or for a certain end device, the USB token 2 or the useful data can be additionally personalized optically and/or electronically within the framework of the manufacture in step S3 ("PERSONALIZE card"), so that a unique assignment of the stored useful data to a user or end device is given and can be checked.

The steps of the method sketched in FIG. 1 can of course also be carried out in a different order if this is technically expedient. Thus, it is for example readily possible to reverse the order of the steps S2 and S3 and to personalize the USB card 1 or the useful data deposited in the memory 23 and only then to encrypt the non-volatile memory. Such technically expedient deviations from the order specified by FIG. 1 are of course also to be embraced by the present application, without this having to be explicitly pointed out in each individual case.

Subsequently, the USB chip card 1 thus equipped by data technology is transferred in step S4 to the relevant user ("SHIP card to user"), for example by being sent to him by mail or being picked up by him at a certain place, for example at a branch of the card issuer or card manufacturer. Use can be made here, too, of the security precautions customary when mailing other data carriers in the shape of chip cards, for example SIM mobile radio cards, bank cards or credit cards or the like, by depositing a secret code, e.g. a PIN, on the chip card or an associated background server and issuing it to the user for employment upon initial operation of the USB chip card 1. Other kinds of security measures are of course also possible, e.g. a biometric identification of the user, or the like.

After receiving the USB chip card 1 the user can check in step S5 ("VERIFY initial_operation_status"), by employing the security unit 24 and the antenna 31, whether the received USB chip card 1 has already been initially operated previously, i.e. useful data might have been tampered with or malicious code loaded to the memory 23, or whether the USB chip card 1 is still in the unused delivery state or preoperational state. If the user ascertains that the USB card 1 is no longer in the preoperational state but has already been initially operated without authorization by a third party, he can immediately send the USB card 1 back to the card issuer or card manufacturer, because in this case it is to be assumed that the useful data in the memory 21 or the USB chip card 1 itself has been tampered with, for example by malicious code being installed that would infect the end device if the USB chip card 1 were connected to the end device via the USB interface 21.

The step S5 thus serves to enable the user to reliably make sure that the integrity of the useful data is given and no danger arises from employing the USB chip card 1. For this purpose, a contactless request is made in step S5a via the antenna 31 to the security unit 24 ("REQUEST ios_message"), upon which the security unit 24 outputs in step S5b a specified message via the antenna 31 ("RETURN ios_message"). This specified message can transport for example the term or the information "unused" and be displayed by the user on a corresponding reading device which is connected to the security unit 24 in a contactless data communication connection via the antenna 31. This specified message is only output, however, when there exists an electrical contact from the antenna 31 via the antenna connection 25 to the security unit 24, and the USB chip card 1 is thus present in the preoperational state.

With reference to FIGS. 2 and 3 it is evident that, upon the initial operation of the USB card 1, the contacting of the antenna contacts 27, 33 must necessarily be interrupted or disconnected in the transition region 26 when the USB token 2 is folded out of the recess of the card body 3 to lay open the USB interface 21 for a connection to an end device.

Upon the manufacture of the USB card 1, the contacting of the antenna contacts 27, 33 of the antenna connection 25 is configured such that the antenna contacts 27, 33, once they have been disconnected by the USB token 2 being initially folded out of the card body 3, cannot be recontacted by the USB token 2 being folded back into the recess. The USB card 1 is thus already configured upon manufacture such that the antenna connection 25 is contacted completely across the transition region 26 and suitably prepared in the transition region 26 in order for an irreversible disconnection of the contact areas 27, 33 of the antenna connection 25 to be effected when the USB token 2 is folded out of the card body 3. This can be obtained for example by employing in the transition region 26 a suitable conductive paste or suitable adhesives that can no longer be contacted after breaking or disconnection. Alternatively, the antenna connection 25 can be configured so as to be readily flexible or contractible in the transition region 26, so that there is no more possibility of contacting upon a break as a result of the USB token being folded out.

Figure 4:
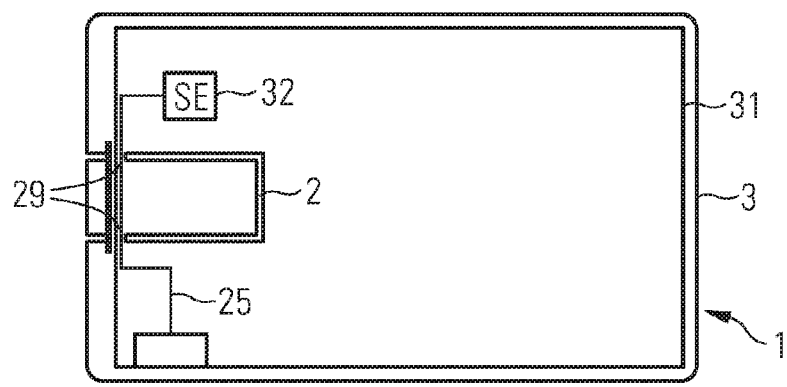
FIGS. 4 to 6 further embodiments of the data carrier according to the invention.

A further configuration of the antenna connection 25 in the transition region 26 is evident from FIG. 4. Therein the transition region 26 is formed by a plastic web which adjoins a hinge element (represented as a black bar) via which the USB token 2 can be folded out of the card body 3. The transition region 26 forms here a break region 29 in which the antenna connection 25 irreversibly breaks when the USB token 2 is folded out. This can be obtained for example by the antenna connection 25 being made of wire which breaks when the USB token 2 is folded out, and is no longer contacted when the USB token 2 is folded in, because the wire ends slip out of place through the mechanical force upon folding out, or are urged aside or superimposed by plastic material of the card body 3. Likewise, it is possible to incorporate the antenna 31 and the antenna connection 25 in the form of an intermediate foil printed with conductive material into a plastic layer stack within the framework of a laminating process during chip-card manufacture such that the antenna intermediate layer irreversibly breaks in the break region 29 when the USB token 2 is folded open.

After the user has ascertained in step S5 as a result of receiving the specified message ("ios_message") that the USB chip card 1 available to him is still in a preoperational state and thus still unused and untampered-with, it is checked in step S6 whether the user is actually authorized to transfer the useful data deposited in the memory 23 to an end device ("AUTHENTICATE"). For such a check there are diverse possibilities, for example the authentication of the user to the security unit 24 or a background system of the card manufacturer or card issuer by means of a PIN which the user has previously received from the card manufacturer or card issuer.

For example, the user can send a PIN together with a one-time password (OTP) generated by the security unit 24 via a suitable web portal to a background server of the card issuer or card manufacturer, which checks the user's authorization. Such an authentication can also comprise a, possibly mutual, authentication of the user or of the USB chip card 1 via the security interface 31 to the end device for which the useful data in the memory 23 are intended. If the user can authenticate himself correctly, the background server releases the USB chip card 1 e.g. via the antenna 31.

The successful authorization or authentication is recorded by the security unit 24 and is the precondition for the memory 23 encrypted by the manufacturer in step S2 being decrypted in step S7 ("DECRYPT nvm"), preferably by the security unit 24 itself. The decryption key necessary therefor is preferably present in a suitable secure region of the security unit 24. Optionally, the security unit 24 can also pass on the decryption key via an electrical connection to the USB controller 22 which then performs the decryption of the memory 23. In so doing, the memory 23 is preferably decrypted irreversibly, so that no re-encrypting is possible any longer. The decryption in step S7 is thus only carried out once and serves as an additional security function in case the basically irreversible disconnection of the antenna connection 25 in the transition region 26 can nevertheless be restored by elaborate tampering with the initially operated USB card 1. For then a user or the security unit 24 would notice that a decrypted memory 23 in a USB card 1 supposedly in the preoperational state is only possible due to outside tampering.

As a further security function, the USB controller 22 is initially inactive in step S1 after the useful data have been loaded to the memory 23. The inactive state of the USB controller 22 can e.g. be specified in/by the security unit 24 through a flag that is accordingly set or not set. An access to the memory 23 is not processed by the inactive USB controller 22, the USB card 1 is then useless. After the successful authentication in step S6, the security unit 24 releases the non-volatile memory 23 in step S8 for an access via the USB interface 21 ("UNLOCK nvm"), by the USB controller 22 being activated through setting of an entitlement flag in the non-volatile memory 23 or in the security unit 24. The USB controller 22 verifies the entitlement flag upon each request of an end device for access to the memory 23 and ascertains whether a release on the part of the security unit 24 is present due to a correct authentication.

The decryption and release of the memory 23 in the steps S7 and S8 are further security functions by which a user can check whether the data carrier is still in a preoperational state. The data carrier is no longer in a preoperational state when the memory 23 has already been decrypted and/or the entitlement flag has already been set.

Finally, the actual initial operation of the USB chip card 1 is effected in step S9 ("INITIALLY_OPERATE card"), by substantially simultaneously (symbolized by the curly bracket in FIG. 1) folding the USB token 2 out of the recess of the card body 3 (step S9a: "LAY_OPEN interface") and thereby irreversibly disconnecting the antenna connection 25 in the transition region 26 (step S9b: "DISCONNECT se").

As a further security measure, the USB card 1 also comprises a capacitor 28 which serves as a time buffer for the initial operation of the USB card 1. The capacitor 28 is charged here via the antenna 31 such that it can supply the USB card 1 with an operating voltage for a certain, rather short time duration, e.g. for five minutes. Within this time duration, beginning e.g. with the successful authentication in step S6 or the initial operation in step S9, a USB connection to the end device must be established via the USB interface 21 and the useful data must be read out via the USB connection. After expiry of the time duration the USB card 1 becomes unfit for functioning and worthless. As a further security measure, the useful data in the memory 23 can be deleted by the USB controller 22 shortly after expiry of the time duration.

After the step S9 the non-volatile memory 23 is completely accessible because, on the one hand, the USB interface 21 is laid open (step S9a) and contactable by an end device and, on the other hand, the memory 23 is decrypted (step S7) as well as the entitlement flag is set for the USB controller 22 (step S8). Accordingly, the step S10 of re-checking for a preoperational state of the USB card 1 leads to a contactless request via the antenna 31 (step S10a: "REQUEST ios_message") no longer being relayable to the security unit 24 due to the disconnection of the antenna connection 25 in the transition region 26, and the specified message no longer being output ("no ios_message"). This indicates to the user that the USB card 1 has already been used or potentially might have been used and tampered with.

Because there is now no more possibility of a data communication connection from outside to the security unit 24, it is also impossible in this state to check the encryption status of the memory 23 or the entitlement flag for the USB controller 22. These security mechanisms are only checked later upon the actual access of an end device to the memory 23 via the USB controller 22.

Figure 5:
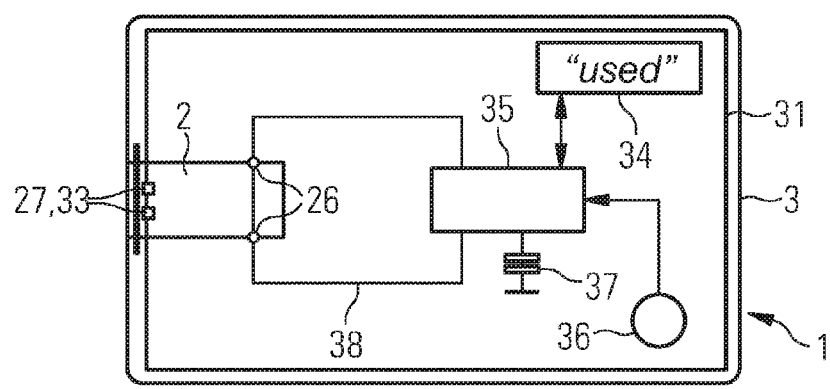

FIG. 5 shows an embodiment of the present invention in which there is integrated in the card body 3 a display device 34, for example an LCD display, which is controlled via a display controller 35 and supplied with operating voltage by a battery 37. A sensor line 38 connected to the display controller 35 extends across a transition region 26 between the USB token 2 and the card body 3, so that the sensor line 38 is likewise disconnected irreversibly as is the antenna connection 25 as soon as the USB card 1 is initially operated by the USB token 2 being folded out.

In step S9 the USB card 1 was initially operated and the sensor line 38 thereby simultaneously cut, so that the display controller 35 controls the LCD display 34 in step S10b such that a specified optical indication is displayed ("DISPLAY used_message"), for example "used" or "initially operated", in order to display to the user that initial operation has been effected. The display of the specified indication is irreversible, so that it is reliably visible to the user from outside that the USB card 1 has already been initially operated.

In step S11 the initially operated USB card 1 is finally connected via the USB interface 21 to an end device ("CONNECT card") and the useful data are read out of the memory 23 by the end device in step S12 ("READ data") and employed in the intended manner, e.g. installed as an update of the firmware.

There can further be integrated into the card body 3 an actuation device 36, for example a button, switch or the like, which is connected to the security unit 24 or to the display controller 35 and can be actuated by the user to request from the security unit 24 a one-time password or other secret code for authentication within the framework of the step S6. The one-time password is supplied by the security unit 24 according to a specified algorithm which is e.g. also known to a background server, so that the one-time password that has been generated and entered by the user can be verified. The security unit 24 generating the one-time password is arranged in the USB token 2, so that it is ensured that a one-time password can no longer be requested after initial operation of the USB card 1 in step S9. For the antenna connection 25 is then likewise disconnected, as is the sensor line 38.

FIG. 4 shows a configuration of a USB card 1 in which a security unit 32 is not arranged in the USB token 2 but rather in the card body 3, for example as a secure chip-card module or the like. In order for the initial operation of the USB chip card 1 by folding out the USB token 2 to also lead to the desired disconnection of the antenna connection 25 in the transition region 26, the antenna connection 25 is in this case guided from the security unit 32 across a transition region 26 configured as a disconnecting region 29 into the USB token 2 and from there across a further transition region 26 configured as a disconnecting region 29 into the card body 3 again for contacting the antenna 31.

Figure 6:
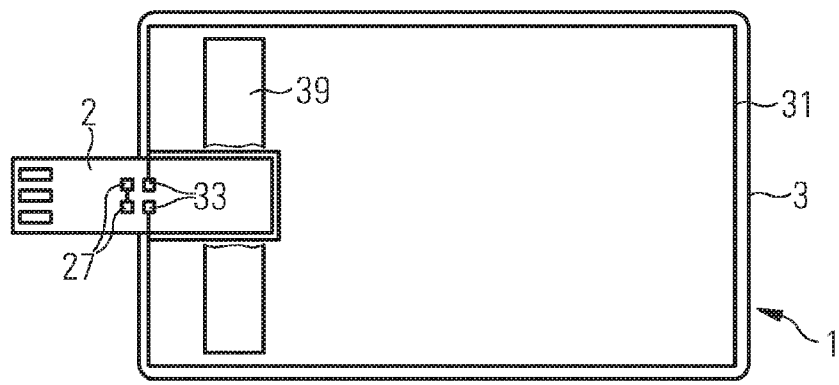

FIG. 6 shows a further configuration of a USB card 1 in which, in addition to the above-described securing measures, an optical seal 39, which is not removable from the card body 3, if possible, is attached across the USB token 2 in the preoperational state such that it tears in a clearly visible way when the USB token 2 is folded out of the card body 3 for the first time. Besides the optical indication of use on the LCD display 34 according to FIG. 5, this is thus a further possibility for a user to immediately recognize the effected initial operation of the USB card 1 without any further auxiliary means. Such visible, optical initial-operation seals round off the above-explained technical initial-operation seals, such as the decryption of the memory 23 (step S7), the activation of the USB controller 22 (step S8), and in particular the disconnection of the antenna connection 25 (step S9b).

The invention claimed is:

1. A method for determining an integrity of a portable data carrier having a non-volatile memory, a memory controller and a memory interface via which an end device can access the memory, the method comprising:
    determining whether an initial operation of the data carrier has been effected,
    wherein a determination of whether the initial operation of the data carrier has been effected is based on a request to a security unit of the data carrier via a security interface of the data carrier, the security interface being connected to the security unit.

2. The method according to claim 1, wherein the initial operation of the data carrier is registered such that a message queriable by the security unit via the security interface before the initial operation is no longer queriable after the initial operation.

3. The method according to claim 1, wherein an electrical connection between the security unit and the security interface is disconnected upon the initial operation.

4. The method according to claim 1, wherein an effected initial operation of the data carrier is checked through a request via the security interface configured as a contactless interface, without the data carrier being connected to an end device via the memory interface configured as a contact interface.

5. The method according to claim 1, wherein the data carrier is initially operated by the memory interface, which is arranged in the data carrier before the initial operation such that it cannot be connected to an end device, being laid open such that it can be connected to an end device.

6. The method according to claim 5, wherein the memory interface is laid open by a memory portion of the data carrier comprising at least the memory interface being folded out of a body portion of the data carrier comprising at least the security interface.

7. The method according to claim 1, wherein before the initial operation, updating data for an end device are stored in the memory of the data carrier, the data carrier is initially operated and connected to the end device via the memory interface, and the end device accesses the updating data via the memory interface.

8. The method according to claim 1, wherein the memory controller releases an access of an end device to the memory via the memory interface when the security unit has ascertained an access entitlement via the security interface.

9. The method according to claim 8, wherein the access entitlement is ascertained on the basis of a one-time password displayed on a display device on request.

10. The method according to claim 1, wherein an encrypted memory content of the memory is decrypted when the security unit has ascertained an access entitlement via the security interface.

11. The method according to claim 1, wherein the effected initial operation of the data carrier is displayed on a display device of the data carrier on request or permanently.

12. The method according to claim 1, wherein a time buffer device releases an access of an end device to the memory via the memory interface only for a specified time duration.

13. The method according to claim 1, wherein an optical seal of the data carrier is damaged with the initial operation of the data carrier.

14. A portable data carrier comprising:
    a non-volatile memory;
    a memory controller;
    a memory interface via which an end device can access the memory;
    a security unit; and
    a security interface electrically connected to the security unit,
    wherein the security unit and the security interface are configured such that an integrity of the portable data carrier can be determined by a determination of whether an initial operation of the data carrier has been effected, and
    wherein the determination of whether the initial operation of the data carrier has been effect is determined based on a request to the security unit via the security interface.

15. The data carrier according to claim 14, wherein the data carrier comprises a memory portion comprising at least the memory interface and a body portion comprising at least the security interface, with the memory portion and the body portion being interconnected such that the memory portion can be folded out of the body portion, so that the memory interface is laid open for a connection to an end device and the electrical connection between the security unit and the security interface is disconnected irreversibly.

16. The data carrier according to claim 14, wherein the data carrier has a chip-card format and/or comprises a flash memory and/or a USB memory interface and/or a contactlessly configured security interface and/or a security module secured against data tampering, and is configured to carry out a method of checking the effected initial operation.

17. A method for manufacturing a portable data carrier according to claim 14, wherein the data carrier is formed from a body portion comprising at least the security interface and a memory portion comprising at least the memory interface, such that the memory interface can be laid open for a connection to an end device, and an electrical connection between the security unit and the security interface is formed which is permanently disconnected with the laying open of the memory interface, such that an electrical re-connecting is not possible.

* * * * *